Aug. 28, 1934.                S. REY                1,972,033
OPHTHALMIC MOUNTING
Filed July 20, 1933
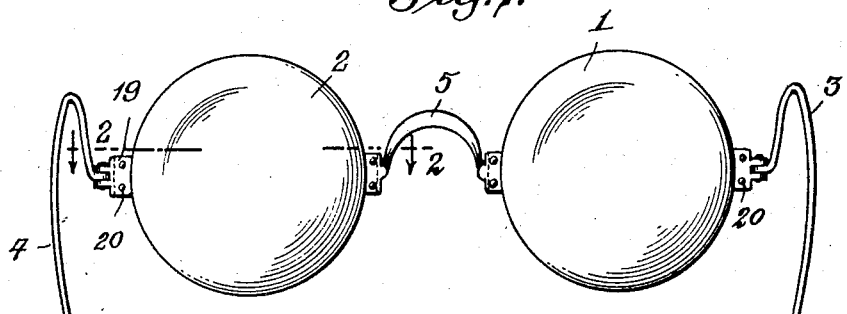
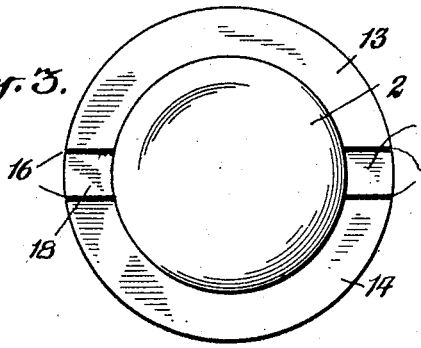   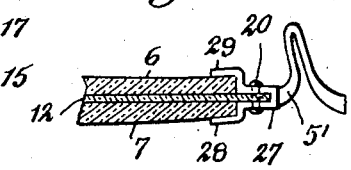
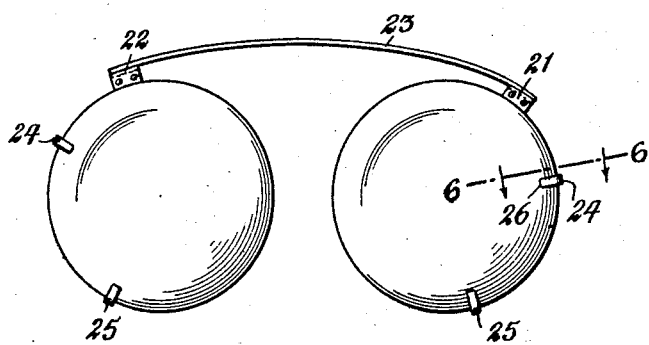   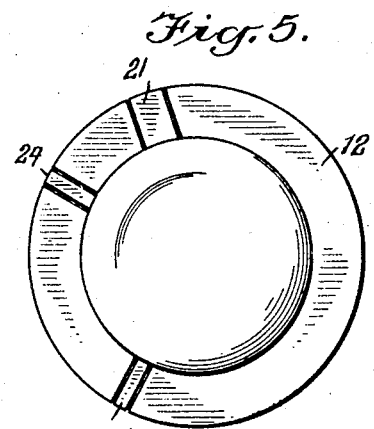
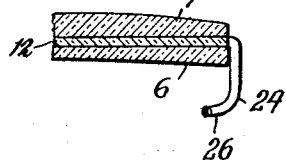
WITNESSES
INVENTOR
Stephen Rey
BY
ATTORNEYS Patented Aug. 28, 1934

1,972,033

UNITED STATES PATENT OFFICE

1,972,033

OPHTHALMIC MOUNTING

Stephen Rey, Brooklyn, N. Y., assignor to Zylo Ware Corporation, Long Island City, N. Y., a corporation of New York Application July 20, 1933, Serial No. 681,350

9 Claims. (Cl. 88—41)

This invention relates to opthalmic mountings and has for an object to provide an improved construction which makes an easy and accurate mounting for temples, nose bridge and other attachments.

Another object of the invention is to provide a mounting which includes a rather tough, transparent body fitted between the glass parts of the lenses and having extensions therefrom for receiving the nose bridge, temples and other attachments.

A still further object of the invention is to provide a mounting including a celluloid plate having one or more extensions projecting beyond the lenses so as to be used in different ways and for various purposes.

In the accompanying drawing—

Figure 1 is a front view of a pair of spectacles disclosing the mountings shown in the invention;

Figure 2 is an enlarged sectional view through Fig. 1 on the line 2—2;

Figure 3 is a front view of one of the lenses and associated parts shown in the construction thereof;

Figure 4 is a front view of a pair of slip-on glasses disclosing certain features of the invention;

Figure 5 is a view of one of the lenses and associated parts shown in Figure 4 before the mounting has been completed;

Figure 6 is an enlarged fragmentary, sectional view through Figure 4 on the line 6—6.

Figure 7 is a fragmentary sectional view similar to the right hand end of Figure 2 but showing a slightly modified form of the invention.

Referring to the accompanying drawing by numerals, 1 and 2 indicate the lenses, while 3 and 4 indicate temples of any desired kind. The lenses 1 and 2 are connected by a desired form of bridge or nose piece 5. As shown particularly in Figure 2 the lens 2, which is identical with lens 1 as far as this invention is concerned, is provided with lens members 6 and 7 of a desired shape to suit the particular individual so as to secure the right focus. These lenses, in addition to being provided with the usual curved faces 8 and 9 for the sake of the desired focus, are provided with flat, smooth surfaces 10 and 11 so that they may fit flatwise against a piece of comparatively tough transparent material 12 which is also smooth on the respective sides. A high-grade piece of celluloid has been found to be a desirable material to be used in forming the member 12. As shown in Figure 3, the supporting member 12 is formed larger than the lens 2 and the portions 13 and 14 are cut off after suitable cuts 15 and 16 have been made to save the extensions 17 and 18. These extensions present a base on which the hinge 19 is mounted and one end of the nose piece 5.

The shape of the nose piece, hinge and associated parts may be of any kind, but preferably are comparatively wide so as to receive two or more screws or rivets 20. It is, of course, evident that one screw or rivet can be used, but preferably two are used because it gives a firmer grip at the respective extensions 17 and 18. It will be understood that the extensions 17 and 18 are cut off and trimmed to the proper size to fit the associated parts so that the rivets 20 may be inserted and upset in a desired manner, whereby the parts will all be rigidly connected together. It will be understood that these connections are all outside of the lenses and, consequently, there is no chance of breaking the lenses during the mounting operation.

The lenses have been shown round, but it is evident that they can be made hexagon shaped or any shape without departing from the spirit of the invention. The supporting plate 12 being substantially large extends beyond the periphery of the lenses regardless of their shape.

The undesired parts of the supporting plate 12 are removed so that only the extensions 17 and 18 are used when the structure is as shown in Figure 1. However, when the invention is applied to other forms of spectacles or similar articles, more or less of the extensions can be used as desired. For instance, in the ordinary oxford, suitable extensions can be provided for receiving a spring and also, if desired, a small extension can be left in place to act as a handle, though ordinarily this is not necessary.

As shown in Figure 4, a slip-on structure is provided which is, generally speaking, of the usual structure excepting for the supporting plate 12, which is provided with extensions 21 and 22 to which the usual spring 23 is secured preferably by two rivets. In addition, small extensions 24 and 25 are left on each supporting plate and these are bent over as shown in Figure 6, so as to present hooks 26. When putting this slip-on in position over a pair of spectacles as shown in Figure 1, the edges are grasped and the spring 23 bent or straightened in a slightly opposite direction and the lenses then slipped in position so that hooks 26 will move to the correct position over the lenses of the spectacles. It will be noted that by using the supporting plate 12 various forms of mountings may be provided, as the extensions may be left at any desired point around each lens. By using this construction rims are unnecessary and yet the temples and other parts may be firmly anchored in place without even contacting with the lenses. It will be understood that after the surfaces 10 and 11 have been prepared, they are covered with a well known adhesive now used in optical work, and the lenses then pressed tightly against the supporting plate 12 and held in this position until the cement has set. After this has been done the cuts 15 and 16 are provided and the portions 13 and 14 removed. Extensions 17 and 18 are then trimmed down to properly receive the fastenings of the bridge or nose piece and the various hinges. After the parts have been mounted as shown in Figure 1, the edge of the supporting plate 12 and various parts are polished to give a finished appearance.

From Figure 5 it will be readily seen that the same structure is provided as shown in Figure 3, but the protruding parts of the supporting plate 12 are provided with a different arrangement of saw cuts so as to provide different extensions, thus providing extensions 21, 24 and 25 which are shown in their operative position in Figure 5. It will be understood that the respective lenses 1 and 2 may not only be of any desired shape, as shown as far as the periphery is concerned, but they may be made to focus in any desired way as now commonly the practice in eye glasses.

As the supporting plate 12 is transparent it will not affect the focusing action of any lens secured thereto but will act as a proper support without the necessity of boring a hole in the glass or without providing a rim for the glass part of the lens.

As shown in Figure 7 the invention also contemplates the use of a nose piece or other fixture 5' having a clamping portion 27 held in place by a rivet or other suitable means 20 as shown in Figure 2. The clamping member 27 is provided with a pair of resilient clamping fingers or plates 28 and 29 which overlap the lens members 6 and 7 and prevent the starting of any looseness between these members and the plate 12. While in the drawing part of a nose piece has been shown, it will be understood that the clamping member or extension 19 carrying the temple may also be provided with resilient clamping arms similar to the arms 28 and 29 without departing from the spirit of the invention.

I claim:—

1. An ophthalmic mounting including a supporting, transparent celluloid plate having anchoring members, a lens on each face of said plate, and adhesive means for securing said lenses on said supporting plate said anchoring members projecting beyond the periphery of said lens.

2. A device of the character described including a transparent, supporting plate having an integral protuberance thereon forming an ophthalmic mounting receiving member, said member projecting beyond the periphery of said lenses, and a pair of lenses mounted flatwise against said plate.

3. A device of the character described including a glass lens, a celluloid supporting plate secured to one face of the lens, said plate having a projection extending beyond the lens and presenting a base for anchoring fittings thereon.

4. A device of the character described comprising a pair of lenses, each lens being divided into two parts, each of said parts having a flat straight surface, a transparent supporting plate formed of a flexible tough substance arranged between said parts, transparent adhesive for connecting said parts to the respective surfaces of said plate, said plate having a protuberance extending therefrom beyond the periphery of said parts said protuberance forming an ophthalmic mounting receiving member.

5. A pair of spectacles including a pair of lenses, each lens being divided into two parts, a celluloid plate arranged between the respective parts, adhesive for connecting said parts to the celluloid supporting plate, said supporting plate having substantially diametrically opposite extensions, a nose piece having substantially U-shaped end members straddling one extension on each of the supporting plates, means for causing said ends to clamp said projections, a pair of temples including a pair of hinged members formed with U-shaped parts straddling certain of said extensions, and means for clamping said U-shaped parts to said extensions.

6. In a device of the character described, a lens formed in two parts, a transparent supporting plate arranged between said parts, transparent adhesive for connecting said parts to said transparent supporting plate, said transparent supporting plate having a pair of extensions formed into hooks, and an extension forming an anchoring base whereby a slip-on pair of spectacles may be formed without the use of a rim.

7. A lens for eye glasses comprising a pair of lens members, each lens member having a flat surface, said flat surfaces being positioned to face each other, a transparent member arranged between said flat surfaces, transparent adhesive connecting said flat surfaces to said transparent member, said transparent member being formed with integral ophthalmic mounting receiving members, projecting beyond the lenses.

8. A device of the character described including a transparent supporting plate formed with a protuberance thereon, a lens mounted flatwise against each face of said plate and anchoring means for anchoring nose pieces, temples and the like to said protuberance, said anchoring means including a clamping member rigidly secured to said protuberance and formed with resilient extending fingers for clamping said lenses.

9. A device of the character described including a transparent resilient supporting plate formed with a plurality of protuberances, a lens mounted flatwise against each face of said plate and between said protuberances, and anchoring members connected to said protuberances, each of said members having a pair of clamping fingers overlapping said lenses.

STEPHEN REY.